(12) United States Patent
Liu et al.

(10) Patent No.: US 9,877,253 B1
(45) Date of Patent: *Jan. 23, 2018

(54) CONTROLLING BASE STATION POWER STATUS BASED ON QUALITY OF SERVICE LOAD

(71) Applicants: Clearwire IP Holdings LLC, Overland Park, KS (US); Sprint Spectrum L.P., Overland Park, KS (US)

(72) Inventors: Chunmei Liu, Great Falls, VA (US); Krishna Sitaram, Chantilly, VA (US); Hemanth B. Pawar, Brambleton, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/204,320

(22) Filed: Jul. 7, 2016

Related U.S. Application Data

(63) Continuation of application No. 14/242,645, filed on Apr. 1, 2014, now Pat. No. 9,461,917.

(51) Int. Cl.
*H04W 36/22* (2009.01)
*H04W 28/02* (2009.01)
(52) U.S. Cl.
CPC ....... *H04W 36/22* (2013.01); *H04W 28/0289* (2013.01)

(58) Field of Classification Search
CPC .......... H04W 52/0206; H04W 52/343; H04W 84/045; Y02B 60/50; Y02B 60/40
See application file for complete search history.

(56) References Cited

U.S. PATENT DOCUMENTS

| | | | |
|---|---|---|---|
| 6,760,594 B1 * | 7/2004 | Murasawa | H04W 28/16 370/335 |
| 7,120,447 B1 * | 10/2006 | Chheda | H04W 52/267 455/422.1 |
| 8,526,305 B2 | 9/2013 | Ramesh et al. | |
| 2004/0110505 A1 * | 6/2004 | Seon | H04W 52/343 455/436 |
| 2006/0068849 A1 * | 3/2006 | Bernhard | H04W 16/28 455/562.1 |
| 2006/0101168 A1 | 5/2006 | Roh et al. | |
| 2007/0066329 A1 * | 3/2007 | Laroia | H04B 7/2678 455/502 |
| 2007/0218904 A1 | 9/2007 | Park et al. | |

(Continued)

*Primary Examiner* — Dung B Huynh

(57) ABSTRACT

A radio access network (RAN) may determine that a quality-of-service (QOS) load of a first base station exceeds a QOS load high threshold. The RAN may further determine that a set of wireless communication devices (WCDs) served by the first base station are located within a geographic area nearby a second base station. The RAN may additionally determine that the set of WCDs are responsible for at least a predefined portion of the QOS load of the first base station, and may power on the second base station. If at some point a second QOS load of the second base station falls below a QOS load low threshold, the RAN may facilitate handover of at least one of the WCDs served by the second base station from the second base station to the first base station, and may power off the second base station.

18 Claims, 6 Drawing Sheets

(56) References Cited

U.S. PATENT DOCUMENTS

| | | | |
|---|---|---|---|
| 2010/0035645 A1* | 2/2010 | Chang | H04W 52/146 455/522 |
| 2011/0065436 A1 | 3/2011 | Svedevall et al. | |
| 2011/0096687 A1* | 4/2011 | Dottling | H04W 24/02 370/252 |
| 2011/0170466 A1* | 7/2011 | Kwun | H04W 52/0235 370/311 |
| 2012/0142328 A1 | 6/2012 | Awoniyi et al. | |
| 2012/0188884 A1* | 7/2012 | Simonsson | H04W 36/0083 370/252 |
| 2012/0196603 A1* | 8/2012 | Mochizuki | H04W 48/02 455/436 |
| 2012/0218966 A1 | 8/2012 | Yamazaki et al. | |
| 2012/0252525 A1* | 10/2012 | Frenger | H04W 52/0206 455/524 |
| 2013/0137446 A1 | 5/2013 | Narlikar et al. | |
| 2013/0194989 A1* | 8/2013 | Centonza | H04W 52/0206 370/311 |
| 2013/0217407 A1* | 8/2013 | Gerlach | H04W 28/08 455/453 |
| 2013/0223317 A1 | 8/2013 | Kudo | |
| 2013/0225227 A1 | 8/2013 | Ericson et al. | |
| 2013/0252660 A1* | 9/2013 | Bach | H04W 52/0206 455/525 |
| 2013/0310048 A1* | 11/2013 | Hunukumbure | H04W 52/0206 455/443 |
| 2014/0011543 A1* | 1/2014 | Li | H04W 52/0206 455/561 |
| 2014/0018077 A1* | 1/2014 | Zhong | H04W 52/0206 455/436 |
| 2014/0073311 A1* | 3/2014 | Xu | H04W 52/0206 455/418 |
| 2014/0170965 A1* | 6/2014 | Li | H04W 28/08 455/7 |
| 2014/0355501 A1* | 12/2014 | Carmon | H04W 36/16 370/311 |
| 2014/0362750 A1* | 12/2014 | Song | H04W 36/0072 370/311 |
| 2015/0009877 A1* | 1/2015 | Chiang | H04W 52/0206 370/311 |
| 2015/0085753 A1* | 3/2015 | Chen | H04W 16/08 370/328 |
| 2015/0223135 A1* | 8/2015 | Ratasuk | H04W 16/32 455/436 |
| 2015/0245270 A1* | 8/2015 | Wu | H04W 36/22 370/331 |
| 2015/0263818 A1 | 9/2015 | Guo et al. | |
| 2015/0312867 A1 | 10/2015 | Cui et al. | |
| 2016/0029305 A1* | 1/2016 | Kim | H04W 24/02 370/311 |
| 2016/0174149 A1* | 6/2016 | Byun | H04W 16/24 455/418 |
| 2016/0192262 A1* | 6/2016 | Comstock | H04W 52/346 370/331 |
| 2016/0234743 A1* | 8/2016 | Comstock | H04W 52/0203 |

\* cited by examiner

CONTROLLING BASE STATION POWER STATUS BASED ON QUALITY OF SERVICE LOAD

CROSS-REFERENCE TO RELATED APPLICATION

This application claims priority to U.S. patent application Ser. No. 14/242,645, filed Apr. 1, 2014, which is hereby incorporated by reference in its entirety.

BACKGROUND

Wireless service providers deploy and operate radio access networks (RANs) that typically include multiple base stations. Each base station may radiate to define one or more wireless coverage areas. These wireless coverage areas may be configured to overlap such that a wireless communication device (WCD) served by a particular wireless provider is afforded substantially continuous wireless coverage as it moves about. For example, when the WCD is nearing the boundary of its serving wireless coverage area, or if the WCD reports low signal strength from the service wireless coverage area, the RAN may hand the WCD over to a new wireless coverage area.

OVERVIEW

In some geographic areas, a wireless service provider may deploy multiple RANs and/or a single RAN with more than one base station in order to improve wireless coverage. For instance, in heavily-populated locations, a RAN may include several base stations each providing wireless coverage on multiple frequencies.

Additionally, some locations may be considered "hot spots" that attract an unusually high traffic demand over a relatively small geographical area. In order to deploy additional wireless coverage in hot spots, smaller-scale wireless equipment may be used. For instance, a base station unit that covers a relatively small physical area may be referred to generically as a pico-cellular base station. A typical pico-cellular base station may be considered to be essentially a low-power, low-capacity version of a macro-type base station, possibly providing the same air interface for wireless access, only for a smaller physical coverage area. As such, macro-network service providers may use pico-cellular base stations to enhance wireless coverage in hot spots.

However, in some locations, demand for wireless services varies over time, e.g., from hour to hour, day to day, and/or week to week. For instance, near a shopping mall, demand for wireless services may be high during hours in which the mall is open, but low when the mall is closed. Similarly, at a convention center, demand for wireless services may be high on days when the center is hosting a convention, and low otherwise.

In order to provide sufficient wireless coverage in such locations, wireless service providers may provision their wireless networks such that these networks can support the offered traffic load of a typical busy hour. This may result in the wireless networks being provisioned to support traffic when demand in the highest. Consequently, when demand is low, a substantial extent, perhaps most, of the wireless service provider's equipment might be idle. Even when idle, this equipment may draw power, e.g., electrical power. Thus, when leaving this idle equipment powered on, the wireless service provider may waste power, leading to increased operational expenses.

In order to save power, a wireless service provider may selectively power on and power off certain base stations (e.g., to the extent they exist, pico-cellular base stations). For instance, if two base stations (such as a macro-cellular base station and a pico-cellular base station) are providing substantially overlapping coverage, and the combined traffic load of these two base stations could be handled by just one base station (e.g., the macro-cellular base station), then WCDs served by the pico-cellular base station may be handed over to the macro-cellular base station. Further, the pico-cellular base station may be powered off. When the traffic load on the active base station exceeds a threshold, the pico-cellular base station may be powered on once again, and at least some WCDs may be handed over to the pico-cellular base station.

In some situations, the decisions to power on or power off a base station may be based not just on an overall traffic load, but a quality-of-service (QOS) load. The QOS load of a base station may represent an extent to which the air interface resources (or other resources) of the base station are dedicated or reserved for particular WCDs. For instance, if a WCD is using a base station for a voice call, approximately 8 kilobits per second of air interface capacity may be reserved for the WCD in both the forward (base station to WCD) and reverse (WCD to base station) directions. In some ways, the QOS load of the base station may more accurately represent the actual resources that are being used by the base station than the overall load, as the latter may vary dramatically from moment to moment.

Accordingly, in a first example embodiment, it may be determined that a QOS load of a first base station exceeds a QOS load high threshold. The QOS load of the first base station may represent an extent to which a traffic capacity of the first base station is assigned to one or more WCDs served by the first base station. It may also be determined that a set of WCDs served by the first base station are located within a geographic area nearby a second base station. The second base station may be powered off, and the geographic area may be defined by the wireless coverage of the second base station when the second base station is powered on. The first and second base stations may be components of a RAN. Possibly in response to determining that (i) the QOS load of the first base station exceeds the QOS load high threshold, and (ii) the set of WCDs are located within the geographic area, it may further be determined that the set of WCDs are responsible for at least a predefined portion of the QOS load of the first base station. Possibly in response to determining that the set of WCDs are responsible for at least the predefined portion of the QOS load of the first base station, the second base station may be powered on.

A second example embodiment may include a non-transitory, computer-readable storage medium, having stored thereon program instructions that, upon execution by a computing device, cause the computing device to perform operations in accordance with the first example embodiment.

A third example embodiment may include a computing device, involving at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. EXAMPLE WIRELESS COMMUNICATION SYSTEM

Figure 1:
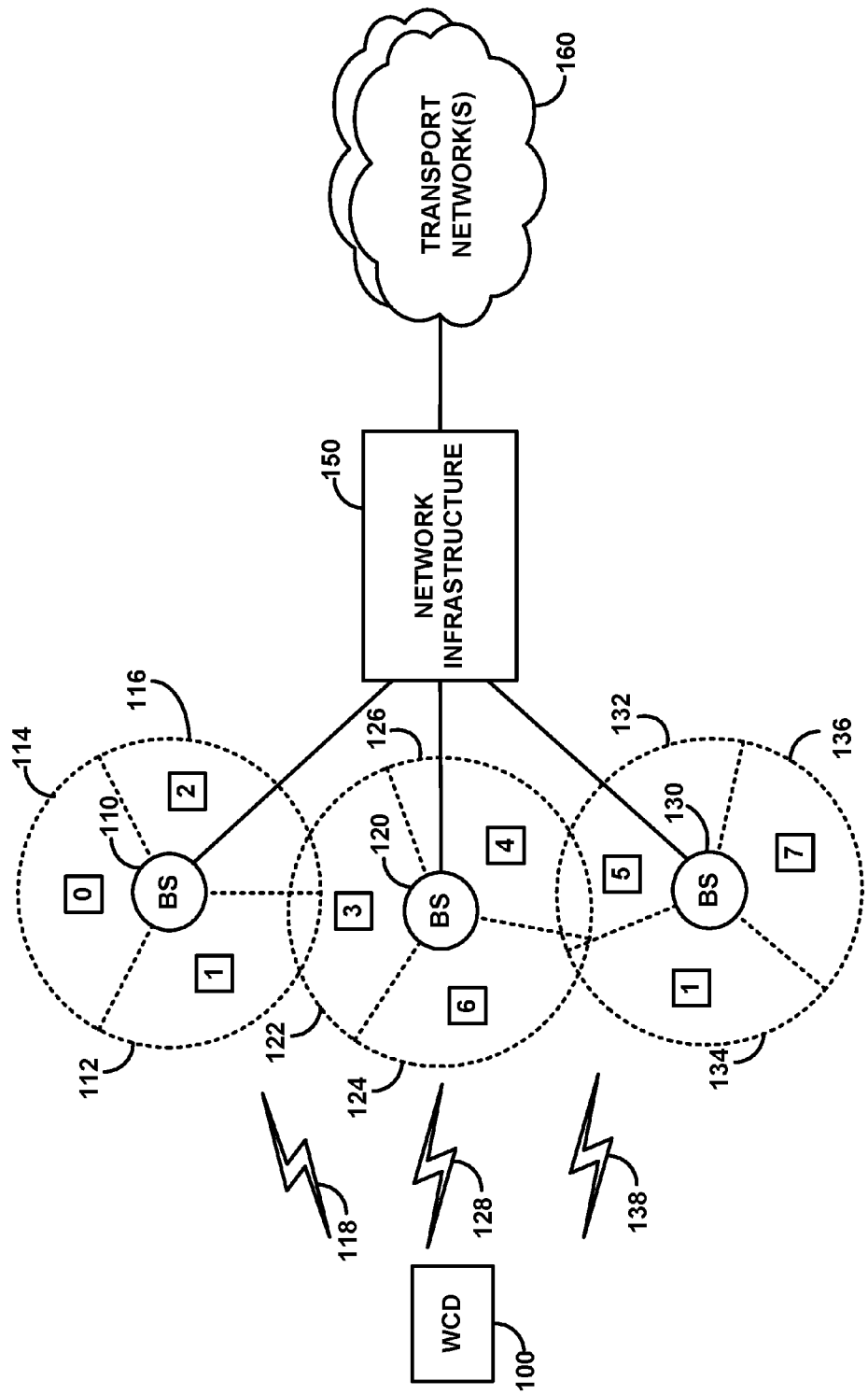
FIG. 1 is a block diagram of a wireless communication system, in accordance with an example embodiment.

FIG. 1 is a block diagram of an example wireless communication system. In FIG. 1, each base station is shown radiating to define one or more wireless coverage areas, each of which may operate on a particular frequency band for instance. In particular, base station 110 is shown radiating to define wireless coverage areas 112, 114, and 116, base station 120 is shown radiating to define wireless coverage areas 122, 124, and 126, and base station 130 is shown radiating to define wireless coverage areas 132, 134, and 136.

The illustrated communication system may operate in accordance with a particular radio access technology such as code-division multiple access (CDMA) and/or Long Term Evolution (LTE). By way of example, the system may be an LTE RAN, in which case each base station may be an LTE eNodeB, and the supporting network infrastructure may include elements such as a mobility management entity (MME), serving gateway (SGW) and a packet data network gateway (PGW). As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well.

FIG. 1 further depicts an example WCD 100 positioned in range of air interface communication with base station 110, base station 120, and base station 130. WCD 100 may receive wireless service from one or more of base station 110, 120, or 130 and may thereby communicate with various remote network entities or with other mobile terminals via network infrastructure 150 and perhaps via one or more transport networks 160.

In operation, each wireless coverage area in the example communication system may radiate to define an air interface. The air interface may include a forward-direction link (downlink) for carrying communications from the serving base station to served WCDs, and a reverse-direction link (uplink) for carrying communications from served WCDs to the serving base station. FIG. 1 shows air interfaces 118, 128, and 138 of wireless coverage areas 112, 124, and 134, respectively. Each of air interface 118, 128, and 138 may include a forward-direction link and a reverse-direction link for communicating with WCD 100. Depending on the radio access technology, these air interface links may take various forms and may define various channels for carrying particular data, such as signaling data and bearer traffic for instance.

By way of example, each wireless coverage area may define a pilot channel or reference channel on which the base station may broadcast a pilot signal or reference signal. WCD 100 may detect these signals as indications of wireless coverage, and may measure these signals to determine wireless coverage strength. Further, each wireless coverage area may define one or more signaling channels that carry various overhead messages, such as system information blocks or the like, specifying characteristics and operational parameters of the wireless coverage area, and perhaps information related to other wireless coverage areas.

Each wireless coverage area may also have a respective wireless coverage area identifier, such as a Physical Cell ID (PCI) or a pseudo-noise (PN) offset. In FIG. 1, for instance, wireless coverage areas 112, 114, and 116 provided by base station 110 have identifiers 1, 0, and 2, respectively. Wireless coverage areas 122, 124, and 126 provided by base station 120 have identifiers 3, 6, and 4, respectively. Wireless coverage areas 132, 134, and 136 have identifiers 5, 1, and 7, respectively. Note that some identifiers may be reused between two or more base stations.

Each wireless coverage area identifier may be indicated to WCDs and other base stations by the pilot or reference signal of the respective wireless coverage area, or specified in another overhead broadcast message or signal. The wireless service provider may, for example, assign each wireless coverage area identifier when the wireless coverage area is installed. The wireless service provider may re-assign wireless coverage area identifiers on occasion, such as when additional wireless coverage areas are added to the network.

When a WCD first powers on or enters into the RAN's wireless coverage, the WCD may scan for pilot or reference signals and determine a signal strength for each detected signal (e.g., a received strength or signal-to-noise ratio). The WCD may determine a wireless coverage area providing the strongest pilot or reference signal, and may engage in a process to register with the network by transmitting an attach request (registration request) to the base station that is providing that signal. In one instance, WCD 100 may identify wireless coverage area 124 as providing the strongest pilot or reference signal and may then transmit an attach request to base station 120.

At the time of attachment or thereafter, a WCD may also engage in signaling with the base station to enter into a connected mode. In the connected mode, the base station has provisioned a radio link connection for use by the WCD, over which the WCD can engage in bearer communication with the base station and thereby with various other entities. In that mode, for instance, the WCD may engage in packet data communications on the Internet and/or a voice call on the publicly-switched telephone network (PSTN). This configuration may be referred to as the WCD receiving wireless service from the base station.

While in the connected mode, the WCD may then continue to regularly scan pilot or reference signals, from both the wireless coverage area serving the WCD and from various other wireless coverage areas. Alternatively or additionally, the base station may direct the WCD to engage in such scanning from time to time. As the WCD carries out this scanning, the WCD may thus again determine the signal strength of various wireless coverage areas, and the identities of those wireless coverage areas. For example, while connected to wireless coverage area 134, WCD 100 may determine the signal strength of wireless coverage areas 112 and 124, among others.

Further, while in the connected mode, the WCD may from time to time transmit to its serving base station a measurement report that specifies the signal strength of each wireless coverage area detected by the WCD. In particular, the measurement report may specify each detected wireless coverage area (e.g., by wireless coverage area identifier) and the signal strength (e.g., reference signal receive strength, or signal-to-noise ratio) of the wireless coverage area as determined by the WCD. In practice, a given measurement report may thus include such information for the WCD's currently serving wireless coverage area and may also include such information for each of one or more other wireless coverage areas detected by the WCD.

If such a measurement report specifies a signal strength of another wireless coverage area, the base station or other network node may engage in a process to decide whether to trigger handover of the WCD to the other wireless coverage area (sometimes referred to as a target wireless coverage area). In general, this process may involve evaluating the reported signal strength of the other wireless coverage area to determine whether it is sufficiently strong to support the WCD, and/or whether it is sufficiently stronger than the reported signal strength of the serving wireless coverage area. Further, the process may involve consideration of other factors as well, such as base station load and backhaul capacity for instance.

If the serving base station decides to trigger handover of the WCD to a target wireless coverage area of another base station, the serving base station may then reference its neighbor relations table (NRT) of nearby wireless coverage areas. The NRT may include indicators (e.g., PCIs) of nearby wireless coverage areas. For each wireless coverage area in the NRT, the NRT may also include an address, such as an IP address, for the base station that defines the wireless coverage area. In this way, a base station or other RAN component, and/or a WCD, may be able to determine how to communicate with a base station that defines a particular wireless coverage area.

For instance, the serving base station may find, in the NRT, a particular wireless coverage area having a matching identifier to the target wireless coverage area. Next, the serving base station may transmit to that other base station, either over a direct inter-base-station interface or through one or more other network entities, a handover request message that requests the other base station to provide service to the WCD via the target wireless coverage area. The handover request message may specify the target wireless coverage area using that wireless coverage area's identifier. The other base station may then engage in a handover preparation process to establish a radio link for the WCD, and the WCD may ultimately transition to be served by that other base station.

Figure 2:
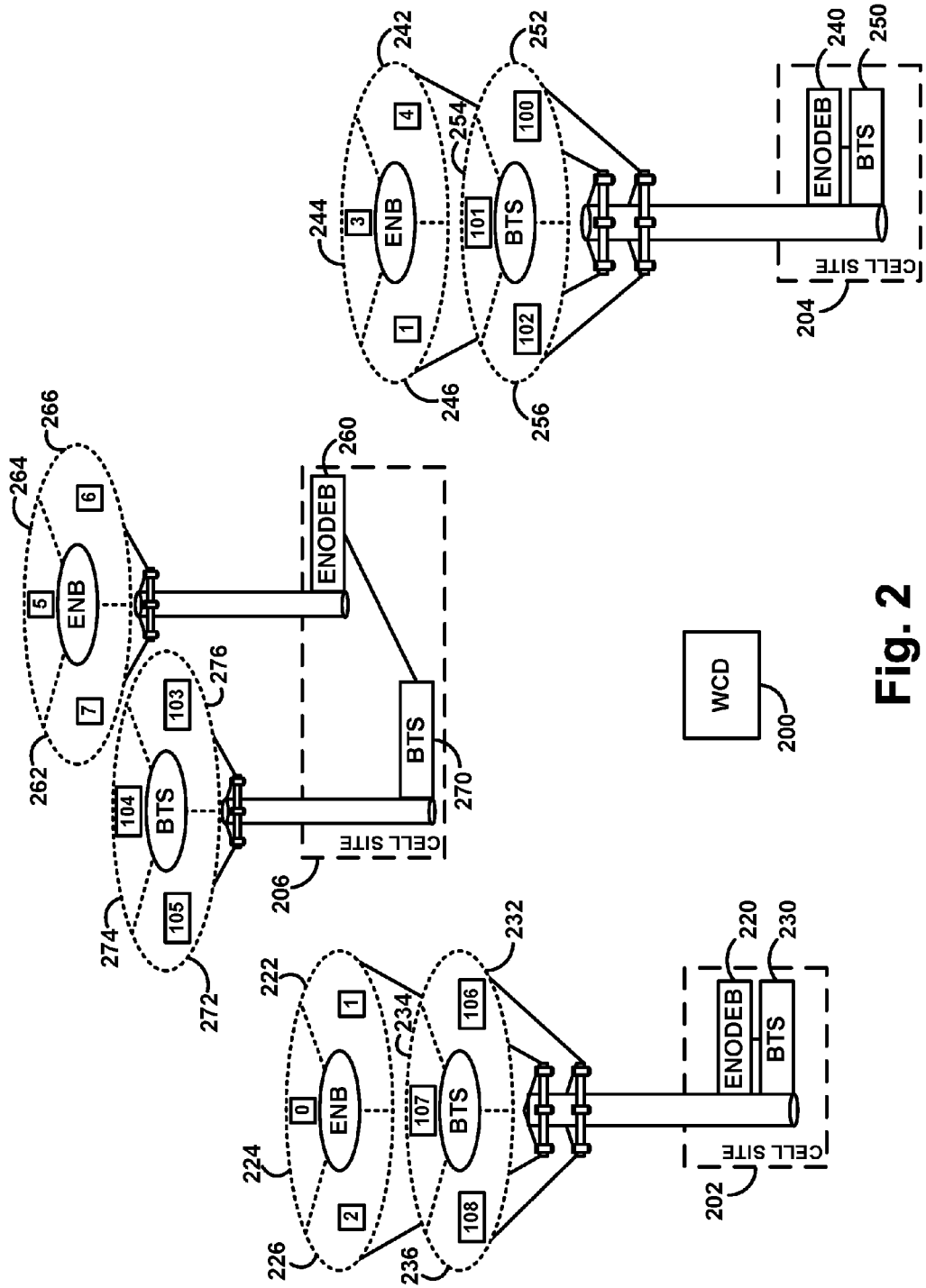
FIG. 2 is a block diagram of various types RAN components, in accordance with an example embodiment.

FIG. 2 is a simplified block diagram of an example communication system in which the example embodiments can be implemented. The example communication system may provide wireless service within a market area. Within the example communication system, components of both an LTE RAN and a CDMA RAN are shown. While an LTE RAN and a CDMA RAN are shown for the purpose of example and explanation, the present method may be implemented using any one or more RANs. For example, the example embodiments may be implemented in a market area in which a wireless service provider operates an LTE RAN and a GSM RAN, or an LTE RAN and one or more pico-cellular base stations. Moreover, the example embodiments may be implemented using a RAN that operates according to one or more other radio access technologies that have yet to be developed.

As shown in FIG. 2, the LTE RAN includes at least eNodeB 220, 240, and 260. ENodeB 220 radiates to provide LTE wireless coverage areas 222, 224, and 226, eNodeB 240 radiates to provide LTE wireless coverage areas 242, 244, and 246, and eNodeB 260 radiates to provide LTE wireless coverage areas 262, 264, and 266. Further, the LTE RAN may include additional components not shown such as the network infrastructure shown in FIG. 1.

The CDMA RAN includes at least base transceiver stations (BTS) 230, 250, and 270. BTS 230 radiates to provide CDMA wireless coverage areas 232, 234, and 236, BTS 250 radiates to provide CDMA wireless coverage areas 252, 254, and 256, and BTS 270 radiates to provide CDMA wireless coverage areas 272, 274, and 276. Further, the CDMA RAN may include additional components not shown.

WCD 200 may operate within the range of these base stations. To receive wireless service, WCD 200 may engage in air interface communication with one or more of eNodeB 220, 240, and 260 of the LTE RAN. WCD 200 may also engage in air interface communication with one or more of BTS 230, 250, and 270 of the CDMA RAN. Air interface communication with components of the LTE RAN may occur concurrently with air interface communication with components of the CDMA RAN, or may occur separately.

Components of a communication system may be co-located and/or integrated together in various ways. For example, as a wireless service provider builds out an LTE RAN in the same market area as a CDMA RAN, LTE eNodeBs may be co-located with CDMA BTSs. For instance, in FIG. 2, eNodeBs of the LTE RAN are shown co-located with BTSs of the CDMA RAN at cell sites. Particularly, eNodeB 220 and BTS 230 are co-located at cell site 202 and share the same tower structure, as shown. ENodeB 240 and BTS 250 are co-located at cell site 204 and also share the same tower structure. ENodeB 260 and BTS 270 are co-located at cell site 204 and are shown having separate tower structures. Further, pairs of co-located base stations, such as eNodeB 220 and BTS 230, may share additional infrastructure, such as network infrastructure 150 as shown in FIG. 1.

In general, the depictions of FIGS. 1 and 2 are illustrative. Therefore, in a RAN, there could be more or fewer of each element than is shown, and some elements may be omitted altogether. Additionally, other types of elements not shown may be present. For instance, the CDMA base stations may be pico-cellular base stations and the LTE base stations may be macro-cellular base stations. Further, any of these elements may be combined with one another, physically or logically, or distributed across multiple physical devices. Thus, the particular arrangements shown in FIGS. 1 and 2 should not be viewed as limiting with respect to the present invention.

Moreover, the arrangement of the depicted wireless communication system, and the processes described herein, are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. EXAMPLE COMPUTING DEVICE

Figure 3:
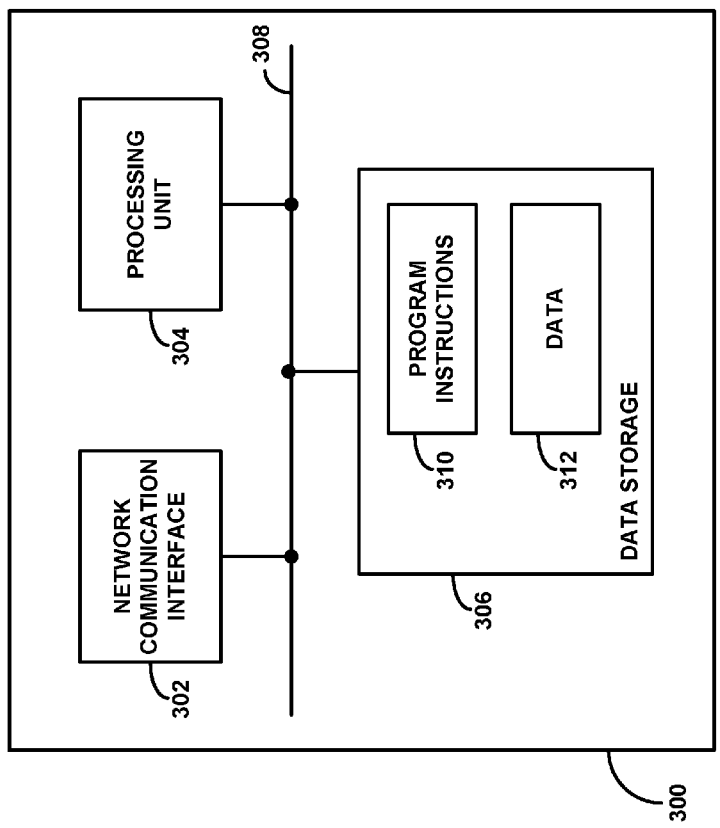
FIG. 3 is a block diagram of a computing device, in accordance with an example embodiment.

FIG. 3 is a block diagram of an example computing device 300. Computing device 300 could be a standalone general purpose or specialized computing device. Alternatively, computing device 300 could be a WCD or part of a RAN, such as a base station, serving gateway, packet gateway, or some other type of RAN component or computer.

As shown, computing device 300 includes a network communication interface 302, a processing unit 304, and data storage 306, all of which may be communicatively linked together by a system bus, network, or other connection mechanism 308. Computing device 300 may also include additional components, functions and/or interfaces not shown in FIG. 3, such as a keyboard, a mouse, a touch screen, a monitor, a printer, and/or one or more ports that interface with such devices, for example a universal serial bus (USB) or high-definition multimedia interface (HDMI) port.

Network communication interface 302 may support communication with various other network entities, such as any of the network entities shown in FIG. 1 or 2. As such, the interface 302 may include one or more network interface modules, such as Ethernet, Wifi, BLUETOOTH®, and/or wide-area wireless connection network interface modules, or any other type of wired and/or wireless communication interfaces.

Processing unit 304 may comprise one or more general purpose processors (e.g., microprocessors) and/or one or more special purpose processors (e.g., application specific integrated circuits, digital signal processors, and/or network processors). Data storage 306 may comprise one or more volatile and/or non-volatile non-transitory storage components, such as optical, magnetic, or flash storage, and may be integrated in whole or in part with processing unit 304.

As shown, data storage 306 may hold program instructions 310 and data 312. Program instructions 310 may be executable by processing unit 304 to carry out various functions described herein and/or depicted in the accompanying drawings. Data 312 could be any data that is generated, received, stored, or used in connection with carrying out such functions.

3. EXAMPLE WIRELESS COVERAGE AND QOS LOAD DETERMINATION

Figure 4:
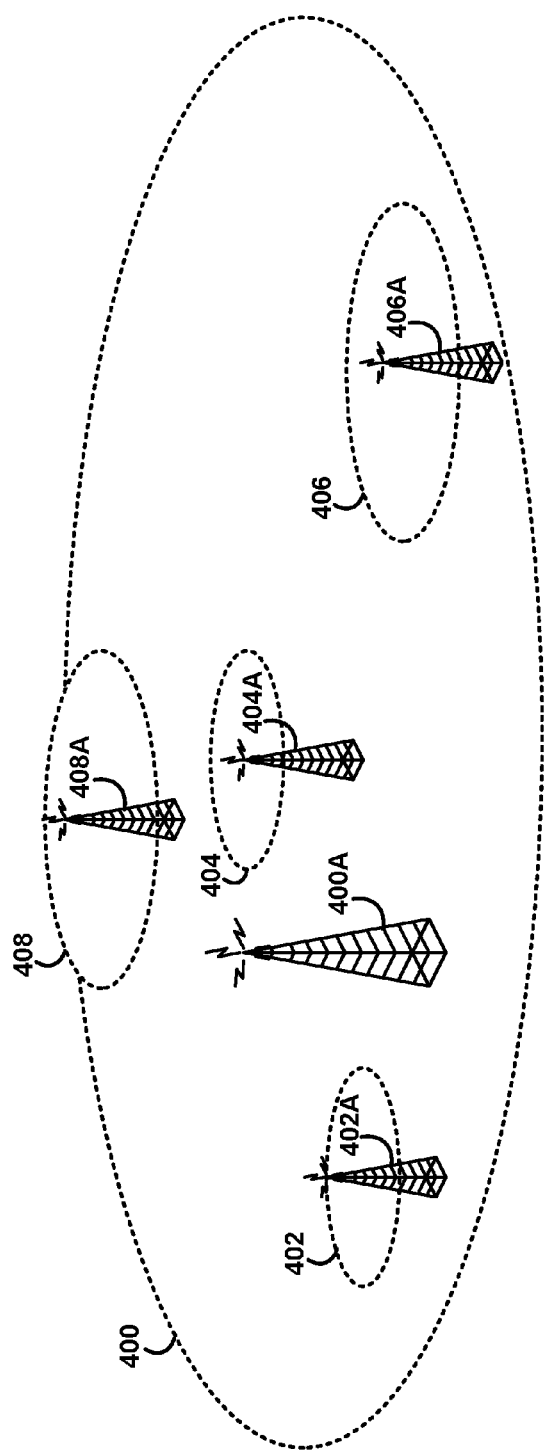
FIG. 4 depicts wireless coverage of base stations, in accordance with an example embodiment.

For purposes of illustration, FIG. 4 depicts an example of wireless coverage for a RAN. Each dashed oval may represent one or more wireless coverage areas (for purposes of simplicity, in the following each oval will be referred to as a single wireless coverage area, even though the embodiments herein are not limited as such). Wireless coverage area 400, defined by base station 400A, may be a macro-cellular wireless coverage area, while wireless coverage areas 402, 404, 406, and 408, defined by base stations 402A, 404A, 406A, and 408A, respectively, may be pico-cellular wireless coverage areas. Macro-cellular wireless coverage area 400 may fully overlap with pico-cellular wireless coverage areas 402, 404, and 406. Macro-cellular wireless coverage area 400 may partially overlap with pico-cellular wireless coverage area 408.

In some embodiments, macro-cellular wireless coverage area 400 may cover a large geographic region that exhibits periods of low traffic load and periods of high traffic load. For instance, macro-cellular wireless coverage area 400 may cover a shopping mall, a convention center, a business office, or some other type of location tends to have cyclic or erratic traffic loads. Possibly in order to compensate for the varying traffic loads, pico-cellular wireless coverage areas 402, 404, 406, and 408 may be deployed in hot spots of traffic demand.

Thus, when the traffic load for macro-cellular wireless coverage area 400 becomes high (e.g., exceeds a high threshold), one or more of pico-cellular wireless coverage areas 402, 404, 406, and 408 may be powered on. The RAN may then handover one or more WCDs from macro-cellular wireless coverage area 400 to the pico-cellular wireless coverage area(s).

Conversely, when the traffic load on one or more of pico-cellular wireless coverage areas 402, 404, 406, and 408 becomes low (e.g., drops below a low threshold), the RAN may handover one or more WCDs on the lightly-loaded pico-cellular wireless coverage areas to macro-cellular wireless coverage area 400. If all WCDs served by a particular pico-cellular wireless coverage area are handed over, that pico-cellular wireless coverage area may be powered off. Alternatively, the pico-cellular wireless coverage area may be powered off even if fewer than all of the WCDs that it is serving are handed over.

Therefore, the RAN may power on pico-cellular wireless coverage areas when traffic load on macro-cellular wireless coverage area 400 is high. The RAN may also power down the pico-cellular wireless coverage areas when the traffic load on the RAN as a whole is low, thereby saving power.

As discussed above, when determining whether and when to power on or power off wireless coverage areas, traffic loads on one or more wireless coverage areas may be considered. In particular, the QOS loads of these wireless coverage areas may provide additional information that can be used to make better determinations than just considering the overall traffic loads.

The QOS load of a base station may represent an extent to which the air interface resources (or other resources) of the base station is dedicated or reserved for particular WCDs. For instance, if a WCD is using a base station for a voice call, approximately 8 kilobits per second of air interface capacity may be reserved for the WCD in both the forward (base station to WCD) and reverse (WCD to base station) directions. In another example, if a WCD is using a base station for video streaming, approximately 500 kilobits per second of forward-direction air interface capacity may be reserved for the WCD. In some ways, the QOS load of the base station more accurately represents the actual resources that are being or may be used by the base station than the overall load, as the latter may vary dramatically from moment to moment.

As an example, in an LTE air interface, data may be transmitted on both forward direction and reverse direction channels in the form of orthogonal frequency division multiplexing (OFDM) symbols. Each OFDM symbol may be formed from a plurality of sub-carriers, typically 12 sub-carriers, each with a bandwidth of 15 kHz. The plurality of sub-carriers that are used to form an OFDM symbol may be associated with a duration that can accommodate a particular number of OFDM symbols. This combination of subcarriers and duration may be referred to as a resource block. For instance, WCDs can use the LTE Physical Uplink Shared Channel (PUSCH) to transmit data to a base station. Portions of the PUSCH may be allocated to particular WCDs by allocating resource blocks. In the time domain, each PUSCH resource block typically occupies a 0.5 millisecond slot of time. In the frequency domain, each resource block may occupy a respective portion of frequency bandwidth, typically 180 kHz.

Thus, a QOS load of a wireless coverage area might be represented by the number of resource blocks of the wireless coverage area that have been dedicated to particular WCDs out of all resource blocks available to that wireless coverage area in a unit of time. For instance, suppose that the forward-direction and reverse-direction channels of a wireless coverage area have a total of 4000 resource blocks to allocate each second. If 3000 of these resource blocks have been allocated to WCDs, then the QOS load of the wireless coverage area may be determined to be 75%.

Alternatively or additionally, the QOS load may include separate considerations of the forward-direction and reverse-direction channels of the air interface. Thus, if each of these channels has 2000 resource blocks to allocate each second, 1300 resource blocks of the forward-direction channel are dedicated to WCDs, and 1700 resource blocks of the reverse-direction channel are dedicated to WCDs, then the QOS load of the forward-direction channel may be determined to be 65% and the QOS load of the reverse-direction channel may be determined to be 85%. In this case, the higher of these two QOS loads may be used as the QOS load of the wireless coverage area.

In some embodiments, QOS load may be represented by something other than a percent. For instance, an absolute number of resource blocks per a given unit of time, or some other representation may be used. Further, QOS load may be based on representations of resource utilization other than resource blocks.

For example, different resource blocks may represent different bit rates. Some resource blocks may contain more OFDM symbols than others, and these OFDM symbols may represent different numbers of bits per unit time. Thus, QOS load may be based on a number of bits per second dedicated to particular WCDs. In some cases, the QOS load may be based on a ratio of (i) air interface capacity represented by dedicated air interface resource blocks to (ii) air interface capacity represented by a total number of air interface resource blocks available to the base station on one or more wireless coverage areas in a unit of time.

Alternatively or additionally, the QOS load of a wireless coverage area or base station may be based on the total QOS loads one or more WCDs served by the wireless coverage area or base station. The QOS load of a particular WCD may be based on (i) a recently-measured or projected air interface signal-to-noise ratio of the particular WCD, and (ii) a minimum air interface bit rate guaranteed to the particular WCD by the RAN. For instance, the QOS load of a wireless coverage area may be or be based on the sum of the QOS loads of WCDs served by that wireless coverage area.

In some cases, the QOS load of a base station may be an aggregate representation of the QOS loads of one or more wireless coverage areas served by the base station, the processing and/or communication capacity of the base station, and/or the backhaul capacity of the base station. The backhaul capacity of a base station may indicate a maximum data rate at which the base station can communicate with other RAN equipment, such as SGWs and/or PGWs.

For example, consider base station 400A. The QOS load of this base station may include considerations of (i) the QOS load of macro-wireless coverage area 400 and/or any other wireless coverage area defined by the base station, (ii) the extent to which the processing capacity of the base station is dedicated to serving the traffic of particular WCDs, (iii) the extent to which the communication capacity of the base station is dedicated to serving the traffic of particular WCDs, and/or the (iv) extent to which the backhaul capacity of the base station is dedicated to serving the traffic of particular WCDs.

It should be understood from the preceding that the term "QOS load" is intended to be interpreted in a non-limiting fashion. Thus, when the QOS load of a base station is discussed herein, one or more ways of determining this QOS load discussed above may be used. Thus, a QOS load of a base station may be based on one or more of the QOS load of the base station itself, the QOS load of one or more wireless coverage areas defined by the base station, a QOS load of the base station's backhaul capacity, and/or other ways of determining a QOS load.

Regardless of how a QOS load is calculated or determined, each wireless coverage area or base station may exhibit a particular QOS load. The higher the QOS load on a particular base station, the more heavily loaded the base station and the less spare capacity the base station might have for additional traffic load.

4. EXAMPLE OPERATIONS

Figure 5:
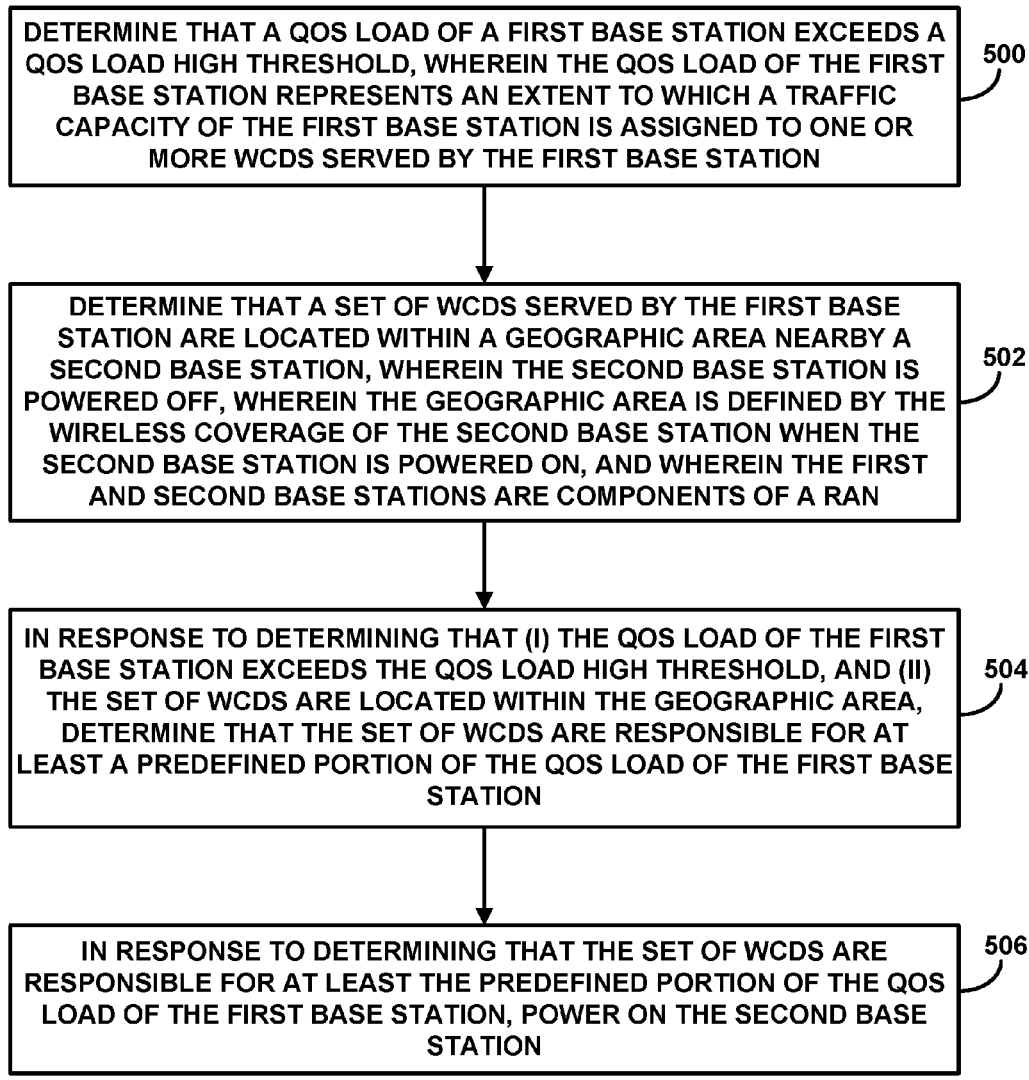
FIG. 5 is a flow chart, in accordance with an example embodiment.
Figure 6:
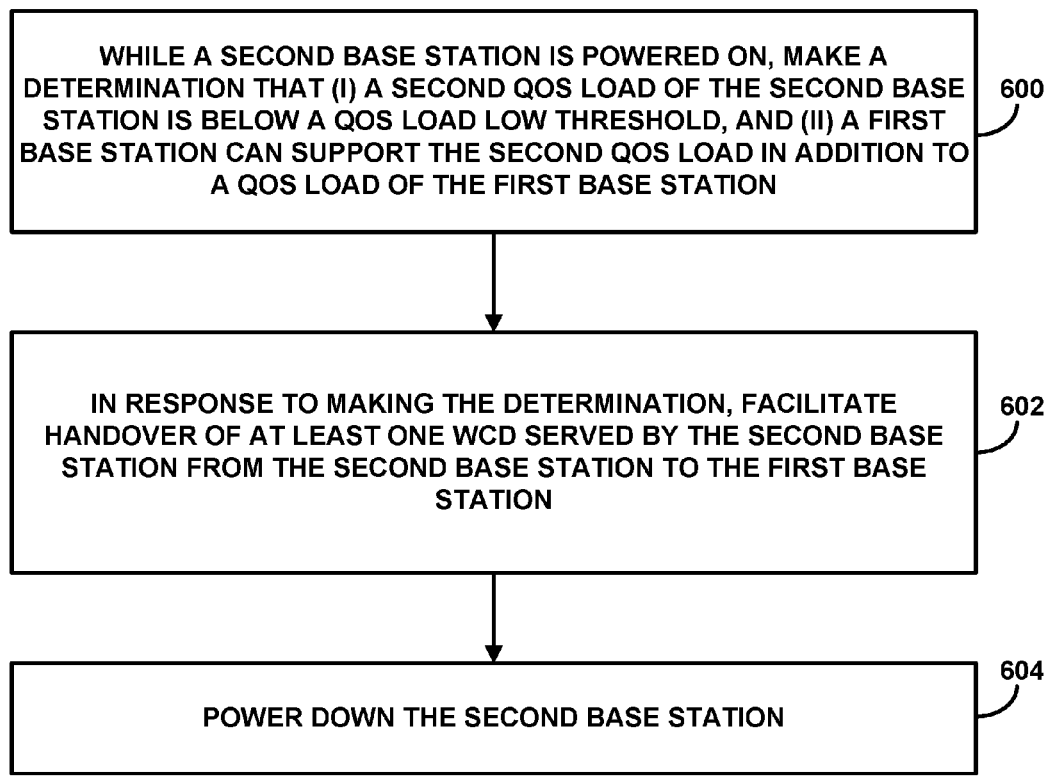
FIG. 6 is a flow chart, in accordance with an example embodiment.

FIGS. 5 and 6 are flow charts in accordance with example embodiments. The operations described in these flow charts may be carried out by a computing device, such as computing device 300. In this context, computing device 300 might be included in any RAN component, such as a base station, an MME, an SGW, a PGW, a BSC, an RNC, an MSC, and/or a PD SN.

At block 500 of FIG. 5, it may be determined that a QOS load of a first base station exceeds a QOS load high threshold. The QOS load of the first base station may represent an extent to which a traffic capacity of the first base station is assigned to one or more WCDs served by the first base station. The QOS load threshold may be, for instance, 50%, 70%, 90%, or some other value.

The first base station may have dedicated air interface resource blocks to at least some of the WCDs served by the first base station. In some embodiments, the QOS load of the first base station may be based on a ratio of the dedicated air interface resource blocks to a total number of air interface resource blocks available to the first base station. In other embodiments, the QOS load of the first base station may be based on a ratio of air interface capacity represented by the dedicated air interface resource blocks to air interface capacity represented by a total number of air interface resource blocks available to the first base station. In further embodiments, a particular QOS load of a particular WCD served by the first base station may be based on (i) a recently-measured or projected air interface signal-to-noise ratio of the particular WCD, and (ii) a minimum air interface bit rate guaranteed to the particular WCD by the RAN.

At block 502, it may further be determined that a set of WCDs served by the first base station are located within a geographic area nearby a second base station. The second base station may be powered off. The geographic area may be defined by the wireless coverage of the second base station when the second base station is powered on. The first and second base stations may be components of the same RAN. The set of WCDs may be less than all WCDs served by the first base station.

At block 504, possibly in response to determining that (i) the QOS load of the first base station exceeds the QOS load high threshold, and (ii) the set of WCDs are located within the geographic area, it may additionally be determined that the set of WCDs are responsible for at least a predefined portion of the QOS load of the first base station. Thus, these WCDs may be considered candidates for handover, possibly because doing so may result in the QOS load of the first base station being reduced by up to the QOS load of these WCDs.

At block 506, possibly in response to determining that the set of WCDs are responsible for at least the predefined portion of the QOS load of the first base station, the second base station may be powered on. While the second base station is powered on, the RAN may facilitate handover of one or more WCDs in the set of WCDs from the first base station to the second base station.

Alternatively or additionally, while the second base station is powered on, the RAN may make a determination that (i) a second QOS load of the second base station is below a QOS load low threshold, and (ii) the first base station can support the second QOS load in addition to the QOS load of the first base station. The QOS load low threshold may be less than the QOS load high threshold. Possibly in response to making the determination, the RAN may facilitate handover of at least one of the WCDs served by the second base station from the second base station to the first base station.

In some cases, the RAN may facilitate handover of all of the WCDs served by the second base station from the second base station to the first base station, and may also power down the second base station. Alternatively, the RAN may facilitate sequential handover of WCDs of served by the second base station from the second base station to the first base station. Between sequential pairs of handovers, the RAN may obtain respective updated QOS loads of the first base station, and the RAN may end the sequence of handovers when a respective updated QOS load exceeds the QOS load high threshold. In this case, the RAN might or might not also power down the second base station.

In some embodiments, the first base station may be a macro-cellular base station and the second base station may be a pico-cellular base station. The first base station may provide macro wireless coverage that exceeds the geographic area defined by the wireless coverage of the second base station.

At block 600 of FIG. 6, while a second base station is powered on, a determination may be made that (i) a second QOS load of the second base station is below a QOS load low threshold, and (ii) a first base station can support the second QOS load in addition to a QOS load of the first base station. At step 602, possibly in response to making the determination, a RAN may facilitate handover of at least one of the WCDs served by the second base station from the second base station to the first base station. At step 604, the RAN may power down the second base station.

In some embodiments, the RAN may facilitate handover of all of the WCDs served by the second base station from the second base station to the first base station, and then power down the second base station. Alternatively, the RAN may facilitate sequential handover of WCDs served by the second base station from the second base station to the first base station. Between sequential pairs of these handovers, the RAN may obtain respective updated QOS loads of the first base station. The RAN may end the sequence of handovers when a respective updated QOS load exceeds a QOS load high threshold. In this latter scenario, the RAN may select to not power down the second base station until the remaining WCDs are handed over.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    determining a first traffic load of a first base station and a second traffic load of a second base station, wherein the first and second base stations are components of a radio access network (RAN) that provides wireless service to wireless communication devices (WCDs), and wherein WCDs served by the second base station are located within a geographic area covered by the first base station, wherein a particular traffic load of a particular WCD served by the first base station is based on (i) a recently-measured or projected air interface signal-to-noise ratio of the particular WCD, and (ii) a minimum air interface bit rate guaranteed to the particular WCD by the RAN;
    determining that (i) the second traffic load is below a traffic load low threshold, and (ii) the first base station can support the second traffic load in addition to the first traffic load;
    in response to determining that (i) the second traffic load is below a traffic load low threshold, and (ii) the first base station can support the second traffic load in addition to the first traffic load, instructing, by the RAN, the second base station to handover at least one of the WCDs served by the second base station to the first base station; and
    causing the second base station to power down after at least one handover completes.

2. The method of claim 1, wherein causing the second base station to power down after at least one handover completes comprises causing the second base station to power down after all handovers complete.

3. The method of claim 1, wherein causing the second base station to power down after at least one handover completes comprises causing the second base station to power off before all handovers complete.

4. The method of claim 1, wherein instructing the second base station to handover at least one of the WCDs served by the second base station to the first base station comprises instructing the second base station to sequentially handover two or more WCDs served by the second base station to the first base station, wherein between sequential pairs of handovers, the RAN obtains respective updated traffic loads of the first base station, wherein the RAN ends the sequence of handovers when a respective updated traffic load exceeds a traffic load high threshold, and wherein the traffic load high threshold is higher than the traffic load low threshold.

5. The method of claim 1, wherein the first traffic load is a first quality-of-service (QOS) load that represents air interface resources of the first base station assigned to WCDs served by the first base station, and wherein the second traffic load is a second quality-of-service (QOS) load that represents air interface resources of the second base station assigned to WCDs served by the second base station.

6. The method of claim 5, wherein the first base station has dedicated air interface resource blocks to at least some of the WCDs served by the first base station, and wherein the first QOS load is based on a ratio of the dedicated air interface resource blocks to a total number of air interface resource blocks available to the first base station.

7. The method of claim 5, wherein the first base station has dedicated air interface resource blocks to at least some of the WCDs served by the first base station, and wherein the first QOS load is based on a ratio of air interface capacity represented by the dedicated air interface resource blocks to air interface capacity represented by a total number of air interface resource blocks available to the first base station.

8. The method of claim 5, wherein a particular QOS load of the particular WCD is based on the greater of (i) a forward-direction QOS load of the particular WCD, and (ii) a reverse-direction QOS load of the particular WCD.

9. The method of claim 1, wherein the first base station is a macro-cellular base station and the second base station is a pico-cellular base station, wherein the first base station provides macro wireless coverage that exceeds the geographic area defined by the wireless coverage of the second base station.

10. An article of manufacture including a non-transitory computer-readable medium, having stored thereon program instructions that, upon execution by a computing device, cause the computing device to perform operations comprising:
    determining a first traffic load of a first base station and a second traffic load of a second base station, wherein the first base station, second base station, and computing device are components of a radio access network (RAN) that provides wireless service to wireless communication devices (WCDs), and wherein the WCDs served by the second base station are located within a geographic area covered by the first base station, wherein a particular traffic load of a particular WCD served by the first base station is based on (i) a recently-measured or projected air interface signal-to-noise ratio of the particular WCD, and (ii) a minimum air interface bit rate guaranteed to the particular WCD by the RAN;
    determining that (i) the second traffic load is below a traffic load low threshold, and (ii) the first base station can support the second traffic load in addition to the first traffic load;

in response to determining that (i) the second traffic load is below a traffic load low threshold, and (ii) the first base station can support the second traffic load in addition to the first traffic load, instructing the second base station to handover at least one of the WCDs served by the second base station to the first base station; and causing the second base station to power down after at least one handover completes.

11. The article of manufacture of claim 10, wherein causing the second base station to power down after at least one handover completes comprises causing the second base station to power down after all handovers complete.

12. The article of manufacture of claim 10, wherein causing the second base station to power down after at least one handover completes comprises causing the second base station to power off before all handovers complete.

13. The article of manufacture of claim 10, wherein instructing the second base station to handover at least one of the WCDs served by the second base station to the first base station comprises instructing the second base station to sequentially handover two or more WCDs served by the second base station to the first base station, wherein between sequential pairs of handovers, the computing device obtains respective updated traffic loads of the first base station, wherein the computing device ends the sequence of handovers when a respective updated traffic load exceeds a traffic load high threshold, and wherein the traffic load high threshold is higher than the traffic load low threshold.

14. The article of manufacture of claim 10, wherein the first traffic load is a first quality-of-service (QOS) load that represents air interface resources of the first base station assigned to WCDs served by the first base station, and wherein the second traffic load is a second quality-of-service (QOS) load that represents air interface resources of the second base station assigned to WCDs served by the second base station.

15. The article of manufacture of claim 14, wherein the first base station has dedicated air interface resource blocks to at least some of the WCDs served by the first base station, and wherein the first QOS load is based on a ratio of air interface capacity represented by the dedicated air interface resource blocks to air interface capacity represented by a total number of air interface resource blocks available to the first base station.

16. The article of manufacture of claim 14, wherein a particular QOS load of the particular WCD is based on the greater of (i) a forward-direction QOS load of the particular WCD, and (ii) a reverse-direction QOS load of the particular WCD.

17. The article of manufacture of claim 10, wherein the first base station is a macro-cellular base station and the second base station is a pico-cellular base station, wherein the first base station provides macro wireless coverage that exceeds the geographic area defined by the wireless coverage of the second base station.

18. A radio access network (RAN) comprising:

a first base station configured to serve one or more wireless communication devices (WCDs);

a second base station configured to support a powered on state and a powered off state, wherein the second base station is further configured to serve one or more WCDs when in the powered on state, and wherein the WCDs served by the second base station are located within a geographic area covered by the first base station, wherein a particular traffic load of a particular WCD served by the first base station is based on (i) a recently-measured or projected air interface signal-to-noise ratio of the particular WCD, and (ii) a minimum air interface bit rate guaranteed to the particular WCD by the RAN; and wherein the RAN is configured to:
  determine a first traffic load of the first base station and a second traffic load of the second base station;
  determine that (i) the second traffic load is below a traffic load low threshold, and (ii) the first base station can support the second traffic load in addition to the first traffic load;
  in response to determining that (i) the second traffic load is below a traffic load low threshold, and (ii) the first base station can support the second traffic load in addition to the first traffic load, instruct the second base station to handover at least one of the WCDs served by the second base station to the first base station; and
  cause the second base station to power down after at least one handover completes.

* * * * *